United States Patent Office.

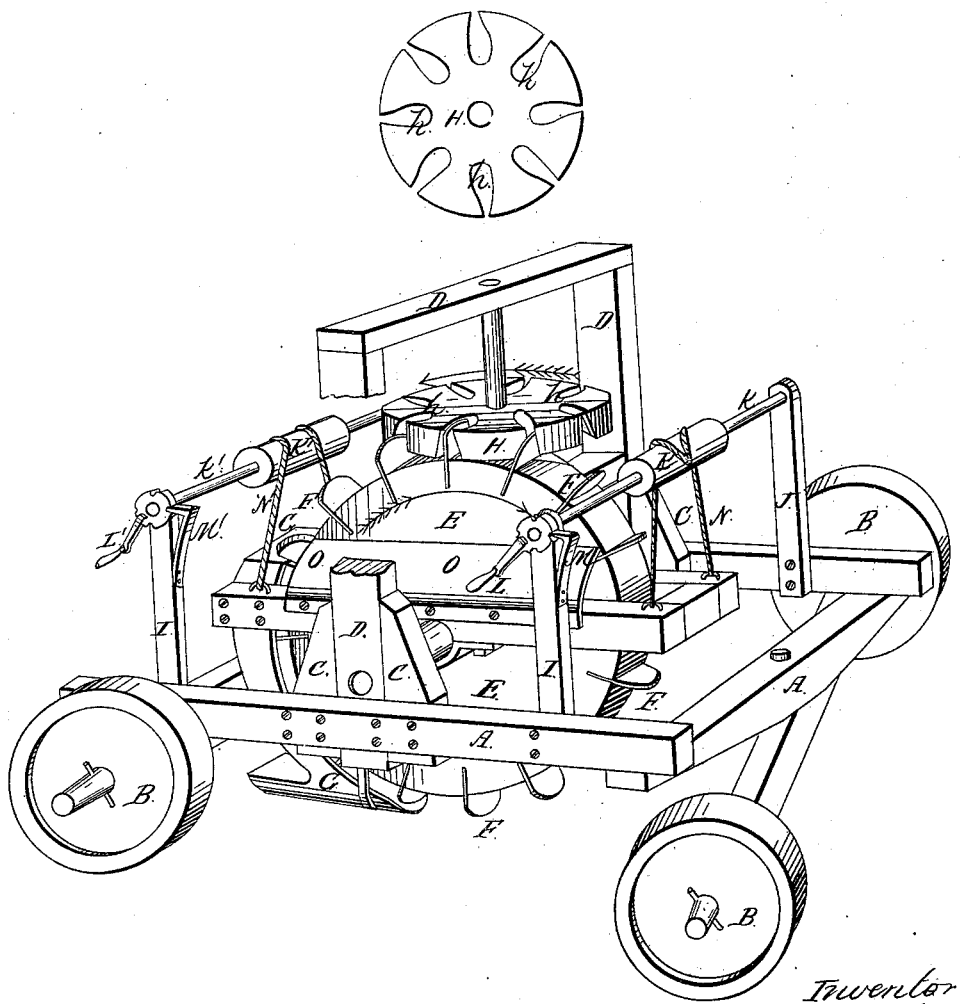

W. REYNOLDS SELFRIDGE, OF GREENSBURG, INDIANA.

Letters Patent No. 80,092, dated July 21, 1868.

IMPROVED DITCHING-MACHINE.

*The Schedule referred to in these Letters Patent and making part of the same.*

TO WHOM IT MAY CONCERN:

Be it known that I, W. REYNOLDS SELFRIDGE, of Greensburg, Decatur county, Indiana, have invented a new and useful Ditching-Machine; and I hereby declare the following to be a full, clear, and exact description thereof, reference being had to the accompanying drawing, making part of this specification.

My invention relates to the class of ditching-machines which operate by the rotation along the ground of a wheel, whose periphery is armed with a series of blades, and has more particular reference to devices for the proper presentation of the excavating-machinery, and for relieving the excavating-wheel and discharging the earth therefrom.

The drawing includes a perspective view of a machine embodying my invention, a portion of the framework being removed, and also includes a top view of the wallower.

A represents the frame, and B the ground-wheels of a truck.

Guides C, on the frame A, restrict to a vertical motion, relatively to the truck, a gravitating frame, D, in which is journalled the wheel E, armed with a series of spades, F, which project from its periphery.

The spades F are preferably formed with rounded terminations, as shown, so as to cut a ditch of corresponding form.

Attached to and depending from the frame D, is a scoop and conductor, G, which is sharpened at its lower edge, and acts to scoop up the earth loosened by the spades, and to hold the same to the excavating-wheel until entirely clear of the ditch.

There is also journalled within the gravitating frame D, a horizontal wheel, H, which I call the wallower, and which has notches, $h$, in its periphery, to receive the spades; the intervening portions, $h'$, meshing between the said spades, acting to discharge from between the spades whatever earth may remain.

Rising from the truck-frame A are standards I J, in which are journalled the shafts $k\ k'$ of windlasses K K', having winches L L', by which to wind them up, pawls M M', to hold them to any desired position, and cords N N', which, extending down to the gravitating frame, enable it to be elevated bodily, or at the front or back respectively, so as to give both the desired penetration to the spades and scoop, and the proper pitch to the latter.

The arrangement also allows of the excavating-wheel and scoop being set deeper for double working, or being elevated entirely clear of the ground, for removal from place to place.

Attached to the gravitating frame is a screen, O, which serves to conduct off to one side of the ditch the dirt ejected by the wallower H.

I claim herein as new, and of my invention—

1. In combination with the excavator E, the wallower or earth-remover H, substantially as set forth.
2. The combined arrangement of the gravitating frame D, excavator E, conducting-scoop G, wallower H, and screen O, with the frame A and windlasses K K', substantially in the manner and for the purpose specified.

In testimony of which invention, I hereunto set my hand.

W. REYNOLDS SELFRIDGE.

Witnesses:
GEO. H. KNIGHT,
JAMES H. LAYMAN.